J. S. BANCROFT & A. L. KNIGHT.
ART OF FORMING, ATTACHING, AND POSITIONING NICK PINS IN TYPE MOLDS.
APPLICATION FILED JUNE 7, 1909.
952,598.
Patented Mar. 22, 1910.
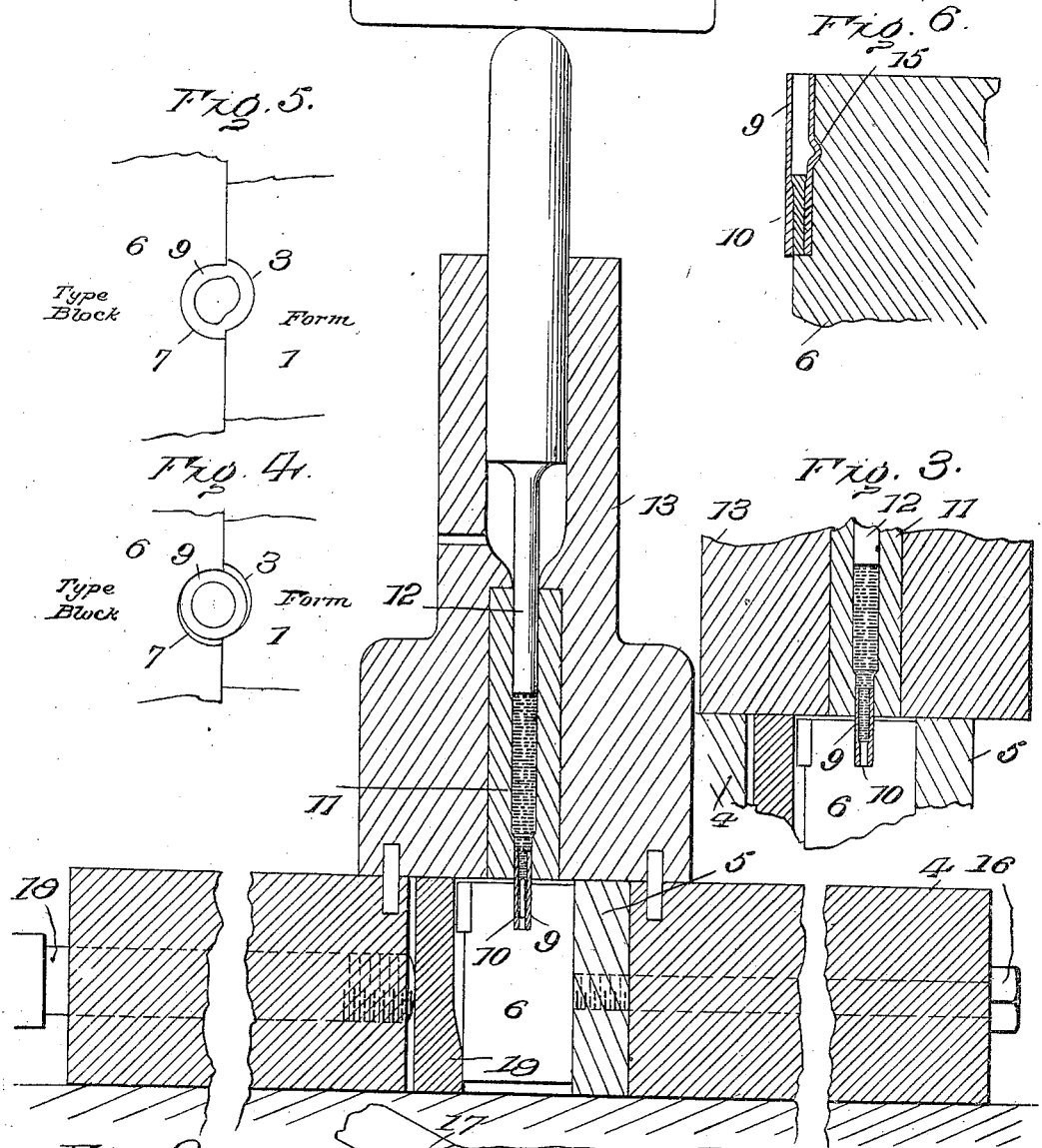
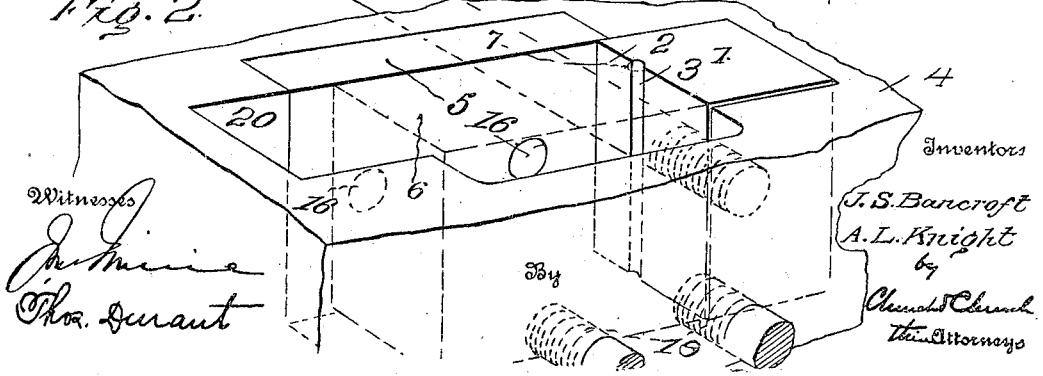

UNITED STATES PATENT OFFICE.

JOHN SELLERS BANCROFT AND AMOS L. KNIGHT, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

ART OF FORMING, ATTACHING, AND POSITIONING NICK-PINS IN TYPE-MOLDS.

952,598.     Specification of Letters Patent.     Patented Mar. 22, 1910.

Application filed June 7, 1909. Serial No. 500,553.

*To all whom it may concern:*

Be it known that we, JOHN SELLERS BANCROFT and AMOS L. KNIGHT, of Philadelphia, in the county of Philadelphia, State of Pennsylvania, have invented a certain new and useful Improvement in the Art of Forming, Attaching, and Positioning Nick-Pins in Type-Molds; and we do hereby declare the following to be a full, clear, and exact description of the same, reference being had to the accompanying drawings, forming a part of this specification, and to the figures of reference marked thereon.

As is well known, an exceptionally high degree of accuracy is required in the construction of type molds, more especially such as are provided with adjustable or movable members for varying the dimensions of the mold cavity, opening the latter and ejecting the type, wherein the maintenance of form is complicated by the necessity for metal tight joints. One of the most difficult of the many problems presented is the locating of the nick pin or protuberance for forming the nick or transverse groove in one side of the type. The mold blade or equivalent member coacting with the mold block or member to which the nick pin is secured, is grooved on one side to receive and fit this protuberance and at the same time rides upon the floor of the mold blade channel, hence to maintain a metal tight joint all around the mold blade at the casting face of the latter, the nick pin or protuberance on the mold block together with the groove in the mold blade must be accurately positioned relative to the floor of the mold blade channel, in order to avoid the binding of the parts or open joints. The problem is further complicated by the circumstance that, for practical reasons, the block or member carrying the nick pin or protuberance is required to have four or more of its surfaces dressed in planes intersecting at predetermined angles, usually 90°. Take, for example, Patent No. 752,814 of February 23, 1904, which illustrates a commercial form of type mold. The side block carrying the nick pin has its front and rear surfaces dressed in parallel planes perpendicular to the base or under surface, the inner or nick pin surface in a plane perpendicular to the base and intersecting the front and rear surfaces at right angles thereto, and the top of the matrix seat in parallel with the base. The tolerance, *i. e.*, permissible degree of variance from standard measurement, is so exceedingly small that it is found commercially impractical to make the protuberant section integral with the mold block, hence it is customary to make it in the form of an insert and to apply it after the faces of the block have been dressed or lapped to the required dimensions. The more common practice is to form an undercut groove in one face extending a short distance from one edge and as near as may be parallel with the base at a predetermined distance therefrom. This is usually done by drilling a small hole near the edge and intersecting the mold blade face. This, in itself a somewhat difficult and delicate operation, is required to be performed prior to the hardening and finishing of the block, in consequence of which it not infrequently happens that when the surfaces of the block have been trued up the nick pin recess is found to be either too near or too remote from the base, so that an after treatment of the inserted nick pin is required to bring it into accurate registry with the groove in the mold blade when the latter is seated in its channel, or, in the alternative, the mold blade must be grooved to correspond with the distorted position of the nick pin.

As the nick pin is the variable factor the most approved practice is to dress the nick pin to standard position and proportions, in accordance with the interchangeable plan of manufacture. This adds materially to the cost of construction as the operation is a delicate one requiring the exercise of a high order of skill and considerable time. Difficulty has also been experienced in securing the nick pin in its seat against longitudinal displacement. The pin is short, (from $\frac{3}{4}''$ to $\frac{5}{8}''$), small in diameter, (approximately $.081''$) and of a material, usually steel, adapted to stand up against the friction of the mold blade and the action of the molten metal injected under considerable pressure into the mold.

Now the primary object of the present invention is to provide an effective, certain and cheap method and means for accurately positioning and securely fastening the nick pin to the mold block, whereby the inaccuracies in the location of the nick pin recess due to the finishing of the mold block are automatically compensated for and the subsequent dressing of the protuberant section rendered unnecessary, and, at the same time, the nick pin is securely anchored in its seat in the mold block.

To these ends the present invention consists, broadly, in subjecting a nick pin blank to a deforming pressure within a sectional cavity formed by the junction of the undercut nick pin recess of the mold block and an associated die, the latter containing a groove or seat corresponding to the exterior or protuberant section of the finished nick pin and located in a fixed and predetermined position relative to the base or other datum line on the mold block and corresponding with the nick pin position on a standard mold block, the pressure thus applied being sufficient to cause the exterior of the blank to conform to the interior walls of the cavity in which it is confined, whereby the nick pin is formed *in situ* with the protuberant section in predetermined relation to the base of the mold block.

The invention further consists in the employment of a tubular or hollow blank and deforming the latter by the application of pressure to the interior thereof, causing the material to expand and fill the confining chamber or cavity; in anchoring the nick pin in its seat or recess by causing the same to interlock with a shoulder in or on the wall of its seat; and in the produced article, all as hereinafter fully described, the novel features being pointed out in the claims.

In the accompanying drawings illustrating a preferred means for carrying the improved method or process into practice—Figure 1 is a longitudinal section through the sub-press equipped with the mold block holding and nick pin blank deforming appliances, the nick pin blank and the recess in the type block being enlarged disproportionally. Fig. 2 is a perspective view of the nick pin forming die and means for adjusting and holding the mold block, the nick pin blank being in position to receive the deforming pressure. Fig. 3 is a sectional view of a portion of the sub-press showing the nick-pin after being subjected to pressure. Fig. 4 is a diagrammatic top plan view illustrating on an enlarged scale the nick pin forming die adjusted to a mold block with a displaced nick pin recess and a tubular nick pin blank in position for the deforming operation. Fig. 5 is a similar view showing the effects of deformation. Fig. 6 is an enlarged sectional view of the nick pin and a portion of the mold block showing the interlocking effect by deformation of the nick pin blank.

Like numerals designate the same parts in the several figures.

It is of the first importance that the die for giving shape to the protuberant section of the nick pin should be firmly clamped to the mold block and accurately positioned relative to the base or other established datum line on said block. To insure this a die block 1 provided with a flat face 2 and transverse groove 3, the latter corresponding with the protruding section of the nick pin and the complemental groove in the mold blade, is secured within an opening or recess in a block or holder 4 with its face 2 perpendicular to the face of a hardened steel plate 5, the latter also secured to block 4. Groove 3 being accurately positioned with relation to plate 5, the latter serves as a datum line or gage for locating the protruding section of the nick pin when the mold block 6 is inserted and clamped with its base upon plate 5 and its nick pin face against the face of block 1. Suitable means, such as wedges or screws, are employed for securely and firmly clamping the mold block into the angle between the die block 1 and plate 5. If the undercut nick pin recess 7 in mold block 6 happens to be properly located with relation to the base or datum line of the latter its edges will register with corresponding edges of groove 3. If, however, as is frequently the case, recess 7 happens to lie slightly to one side of the standard position, due to the dressing performed upon its base or the inaccurate forming of said recess, or in the event it is desired to increase or diminish the lateral dimensions of the protuberant section of the nick pin relative to the width of recess 7, the edges of the groove and recess will be more or less out of register. A displacement such as above referred to is illustrated in Figs. 4 and 5. Having secured the mold block and die block in the described relative positions a nick pin blank 9 is inserted within the cavity formed by the junction of recess 7 and groove 3, and sufficient pressure is applied to said blank to cause it to expand into contact with the walls of said cavity, as indicated in Fig. 5, the portion conforming to and contained within undercut recess 7 serving as the means of attachment to the mold block, while the protuberant section not only takes the form of groove 3, but is at the same time accurately positioned upon the mold block with relation to its base or other datum line.

In the example illustrated the hardened steel plate 5 is held to position by one or more bolts 16 extending through the wall of block 4 and threaded into said plate, and die block 1 is in like manner provided with a similar bolt 17. The mold block 6 is held firmly in contact with the face of plate 5 by means of bolts 18 threaded into block 4 with their inner ends engaging a shoe 19, the latter interposed between said screws and block 6. A wedge (not shown) or equivalent means inserted in the space 20 between blocks 4 and the end of block 6 serves to hold the grooved face of said mold block in contact with the face of die block 1 while pressure is being applied to the blank 9.

The deformation of the blank is preferably performed by cold pressure and to facilitate this the blank is made tubular or hollow and the deforming pressure applied to its interior. The lower or inner end of the blank engaging the end wall of recess 7 is closed, as by the insertion of a plug 10 of soft metal such as copper, and to facilitate the insertion and engagement of said plug the upper section of the blank is formed with a slightly enlarged bore, so that notwithstanding the small dimensions of the blank (less than .081" diameter) the plug can readily be entered therein and when entered will drop by gravity or may be forced into the smaller bore at the inner end. In Fig. 1 the plug 10 is illustrated as engaging the inner end of the smaller bore, into which it is first forced and then expanded by the pressure transmitted through the liquid above said plug, this method of inserting the plug being preferred as tending to prevent accidental escape and to secure accurate fitting of the plug within the smaller bore, otherwise the plug might be fully entered within said smaller bore before pressure is applied. The upper end of the blank projects beyond the mold block and die plate and is fitted to the open end of a cylinder 11 charged with a fluid, oil for example, and equipped with a piston 12. The piston and cylinder are supported in a head 13, the latter resting loosely upon block 4 and provided with dowel pins or equivalent means for alining cylinder 11 and blank 9. The parts being adjusted to position pressure is applied through piston 12 to the liquid within the blank as well as to the soft metal plug in the end thereof upsetting the latter and causing the blank to expand radially in all directions until its exterior surface conforms accurately to the inclosing walls. The application of pressure to piston 12 may be performed by a weight of approximately seventy pounds falling through a distance of about twelve inches and the drop may be repeated if required, although in practice a single drop of the weight is usually sufficient. Other known means, such as an accumulator or hydraulic press may be employed to produce the required pressure within the blank, but that described has proved effective in practice.

To prevent the accidental displacement of the nick pin under normal conditions of use, the wall of recess 7 is furnished with one or more lateral depressions or projections, illustrated by the depression 15, Fig. 6, into which the material of the nick pin blank is driven by the deforming pressure applied within the latter.

After the nick pin has been thus formed, seated and located all that is required to finish the mold block is to dress off the projecting end flush with the face of the mold block.

The new and improved product of the method described is not herein claimed but is reserved for a divisional application.

Having thus described our invention, what we claim as new, and desire to secure by Letters Patent of the United States, is:—

1. The improvement in the art of fitting nick pins in type mold blocks which consists in subjecting a blank to a deforming pressure within a confining cavity or chamber at the junction of the mold block and an associated forming and positioning die block.

2. The improvement in the art of fitting nick pins to type mold blocks which consists in subjecting a blank to deforming pressure within a cavity or chamber at the junction of the mold block and a die, the section of said cavity or chamber contained in the mold block being undercut and the section in the die conforming to the protuberant face of the nick pin being accurately positioned relative to a fixed datum line on the mold block, whereby the protuberant section is accurately positioned and at the same time secured to the mold block.

3. The improvement in the art of fitting nick pins in type mold blocks which consists in inserting a tubular blank within a recess or chamber formed at the junction of the face of the mold block and a detachable die, the section of said recess contained in the mold block being undercut and that in the die located in predetermined relation to the base or datum line of the mold block, and applying pressure within the blank sufficient in degree to expand the same into contact with the walls of the containing cavity or recess.

4. The improvement in the art of fitting and securing nick pins in undercut grooves in type molds which consists in providing said groove with a lateral recess or shoulder; clamping to the grooved face of the mold block a die containing a groove corresponding to the protuberant section of the nick pin and accurately located with relation to the base of or a datum line on the mold block, said die groove communicating with the groove in the mold block; inserting a blank within the chamber between the mold block and die; and subjecting said blank to a deforming pressure, sufficient in degree to cause the material to expand and contact with the surrounding walls of the chamber.

5. The improvement in the art of forming and fitting nick pins for type mold blocks provided with undercut grooves or recesses which consists in applying to the grooved face of the mold block a die containing a groove or recess communicating with that in the mold block and conforming in shape and position to the protuberant section of the nick pin, and applying deforming pressure to the interior of a tubular blank within said grooves or recesses, whereby the blank is caused to fill the recess or groove within the mold block and be anchored therein while the portion of the blank outside the mold block is both shaped and accurately located to conform to the form and assigned position of the protuberant section of the nick pin.

6. The improvement in the art of forming and positioning nick pins for type molds which consists in subjecting a tubular blank to deforming pressure applied to the interior of said blank while located within a confining chamber composed in part by the undercut walls of a groove or recess in the face of the mold block and in part by a communicating groove or recess in a die block applied to the face of the mold block, said die groove corresponding to the exposed surface of the protuberant section of the nick pin and being accurately located relative to a datum line on the mold block.

7. The improvement in the art of forming attaching and positioning nick pins for type molds which consists in inserting a soft metal plug in one end of a tubular blank, confining said blank in a cavity formed partly in a die block and the balance in the mold block, and simultaneously expanding the tubular blank and upsetting the inserted plug by fluid pressure applied to the interior of said blank.

JOHN SELLERS BANCROFT.
AMOS L. KNIGHT.

Witnesses:
   MORTIMER A. JONES,
   JOSEPH B. CHURCH.